United States Patent
Walach et al.

(10) Patent No.: US 8,931,898 B2
(45) Date of Patent: Jan. 13, 2015

(54) NON-PROGRESSIVE CORRIDOR BI-FOCAL LENS WITH SUBSTANTIALLY TANGENT BOUNDARY OF NEAR AND DISTANT VISUAL FIELDS

(71) Applicants: Michael Walach, Largo, FL (US); Andrzej Fijalkowski, Warsaw (PL)

(72) Inventors: Michael Walach, Largo, FL (US); Andrzej Fijalkowski, Warsaw (PL)

(*) Notice: Subject to any disclaimer, the term of this patent is extended or adjusted under 35 U.S.C. 154(b) by 0 days.

(21) Appl. No.: 14/178,992

(22) Filed: Feb. 12, 2014

(65) Prior Publication Data

US 2014/0362340 A1 Dec. 11, 2014

(30) Foreign Application Priority Data

Jun. 7, 2013 (PL) .......................... 404250

(51) Int. Cl.
*G02C 7/06* (2006.01)

(52) U.S. Cl.
CPC ....................... *G02C 7/06* (2013.01)
USPC .................................... 351/159.41

(58) Field of Classification Search
CPC ........... G02C 7/041; G02C 7/06; G02C 7/068
USPC ................................... 351/159.41
See application file for complete search history.

(56) References Cited

U.S. PATENT DOCUMENTS

| | | | |
|---|---|---|---|
| 1,406,782 A * | 2/1922 | Tillyer ................. | 351/159.45 |
| 1,731,419 A * | 10/1929 | Hill et al. ............. | 351/159.48 |
| 2,109,474 A | 3/1938 | Evans | |
| 4,869,588 A | 9/1989 | Frieder et al. | |
| 4,952,048 A | 8/1990 | Frieder et al. | |
| 5,583,589 A | 12/1996 | Phillips | |
| 5,724,120 A | 3/1998 | Svochak et al. | |
| 5,953,099 A | 9/1999 | Walach | |
| 6,089,713 A | 7/2000 | Hof et al. | |
| 8,272,734 B2 | 9/2012 | Torrey | |
| 2005/0068490 A1 | 3/2005 | Mandell et al. | |
| 2005/0099595 A1 | 5/2005 | Lindacher | |
| 2008/0002148 A1 | 1/2008 | Menezes | |

OTHER PUBLICATIONS

ISA/RU, Notification of Transmittal of the International Search Report and the Written Opinion of the International Searching Authority, or the Declaration, Oct. 9, 2014.

* cited by examiner

*Primary Examiner* — Zachary Wilkes
(74) *Attorney, Agent, or Firm* — McCormick, Paulding & Huber LLP

(57) ABSTRACT

An axially symmetric, bifocal, non-progressive ophthalmic lens which, in a smooth pathway between a distant vision field and a near vision field, has no perceptible progression of power, dividing line, image jump, nor other optical distortion.

6 Claims, 2 Drawing Sheets

US 8,931,898 B2

NON-PROGRESSIVE CORRIDOR BI-FOCAL LENS WITH SUBSTANTIALLY TANGENT BOUNDARY OF NEAR AND DISTANT VISUAL FIELDS

CROSS REFERENCE TO RELATED APPLICATIONS

The present application claims priority under the Paris Convention and 35 USC §119(a) to, and hereby incorporates herein by reference the disclosures of, Polish Patent Application P.404250, filed Jun. 7, 2013 under the title "Dwougniskowa nieprogresywna soczewka optyczna."

BACKGROUND

1. Technical Field

The present invention relates to ophthalmology. Particular embodiments relate to multi-vision ophthalmic lenses such as bifocals.

2. Discussion of Art

Throughout a human lifespan, ocular muscles continually exert focusing forces on the lens and ball of the human eye. Over time, the eye ball and lens deform permanently. This deformation results in a "multi-vision" effect wherein a person has difficulty focusing on both near and distant objects. Accordingly, two main categories of multi-vision lens have been developed: bifocals or progressives.

Bifocals have two distinct regions of differing optical power, typically a lower region for near vision and an upper region for distant vision. Wearers of bifocals are familiar with the disconcerting "jump" and "bend" that can occur at the defined line between the near and distant focal regions.

On the other hand, conventional progressives have a "progressive corridor" of gradually varying optical power that extends along an umbilical coil that joins a distant vision region of a first optical power with a near vision region of a second optical power. Surrounding the progressive corridor and the near and distant vision regions, progressives have a blended region of generally continually varying focal strength. The continual variance of focal strength eliminates jump, but often introduces astigmatism along with other visual defects.

Despite many advances in the field of multi-vision lenses, lens designers continue to face a trade off between undesirable image jump at a bifocal line, or undesirable image distortions outside a narrow progressive corridor. Thus, it remains desirable to provide a lens that avoids both bifocal jump and the astigmatism associated with standard progressive lens designs.

BRIEF DESCRIPTION

Accordingly, embodiments of the present invention provide an axially symmetric, bifocal, non-progressive ophthalmic lens which, in a smooth pathway between a distant vision field and a near vision field, has no perceptible progression of power, dividing line, image jump, nor other optical distortion.

In particular embodiments, the distant and near vision fields are formed by first and second optical surfaces designed and formed only on an internal (concave) surface of the lens. The two optical surfaces either meet each other seamlessly at a contact point defining a common tangent surface, or are connected with each other via a contact surface, which is substantially cotangent with each of the two optical surfaces. Co-tangency of the two optical surfaces at the contact point, or substantial co-tangency of the two optical surfaces via the contact surface, provides a smooth pathway between the two vision fields, by which the perceived optical power transitions sharply and without image jump from distant vision to near vision or the reverse.

In certain embodiments, the contact surface is centered on a line that extends orthogonally from the contact surface through a center of an intersected volume of the solids defined by extensions of the first and second optical surfaces. In such embodiments, the lens is designed and formed such that the contact surface is not larger than the diameter of a prescribed wearer's pupil. Maintaining the contact surface smaller than the diameter of the prescribed wearer's pupil provides a desirable result that the contact surface is not perceptible by the wearer, but instead continues a smooth pathway between the two vision fields, by which the perceived optical power transitions sharply and without image jump through the contact point.

These and other objects, features and advantages of the present invention will become apparent in light of the detailed description thereof, as illustrated in the accompanying drawings.

DRAWINGS

DETAILED DESCRIPTION OF THE DRAWINGS

Figure 1:
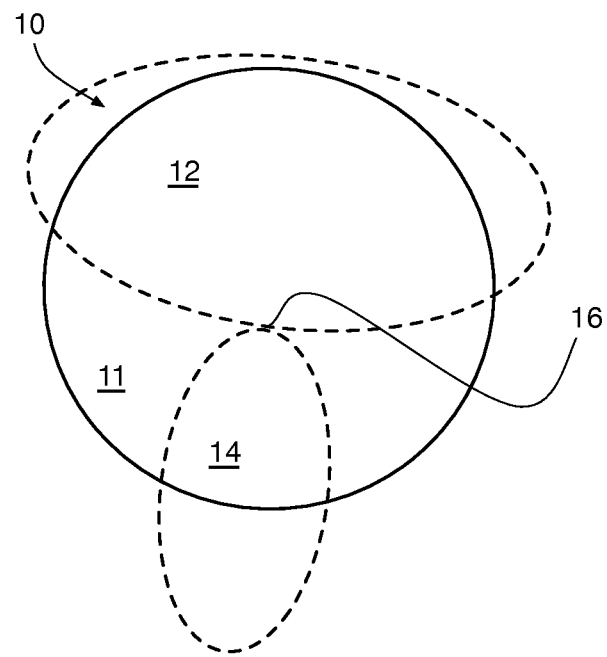
FIG. 1 shows in plan a lens according to an embodiment of the invention, with first and second optical surfaces connected at a contact point.

FIG. 1 shows an embodiment of the invention in plan view from the eye side of a bifocal, non-progressive lens 10 that includes at an internal (concave) surface 11 two surfaces 12, 14 of different focal power, i.e. a first optical surface 12 and a second optical surface 14, which respectively provide distant and near visual fields smoothly blended to each other and to the remainder of the concave surface, without the familiar bifocal segment.

The first and second optical surfaces 12, 14 are directly connected through a contact point 16, at which the larger-radius near vision surface 14 is co-tangent with the smaller-radius distance vision surface 12. Thus, the optical surfaces 12, 14 are not intersected within the concave surface 11 of the lens 10, instead, only at the contact point they have a common tangent surface that is internal to the lens 10.

Figure 2:
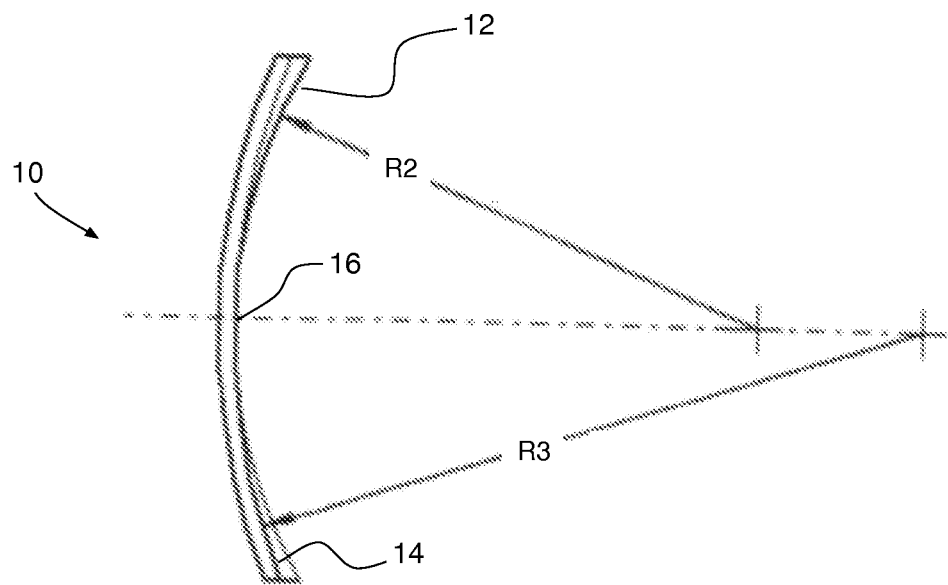
FIG. 2 shows in section the lens shown in FIG. 1.

FIG. 2 shows from side view the same surfaces 12 and 14, having respectively a shorter radius R2 for distant vision and a longer radius R3 for near vision. Not shown is the yet larger radius of the convex lens surface 18.

Figure 3:
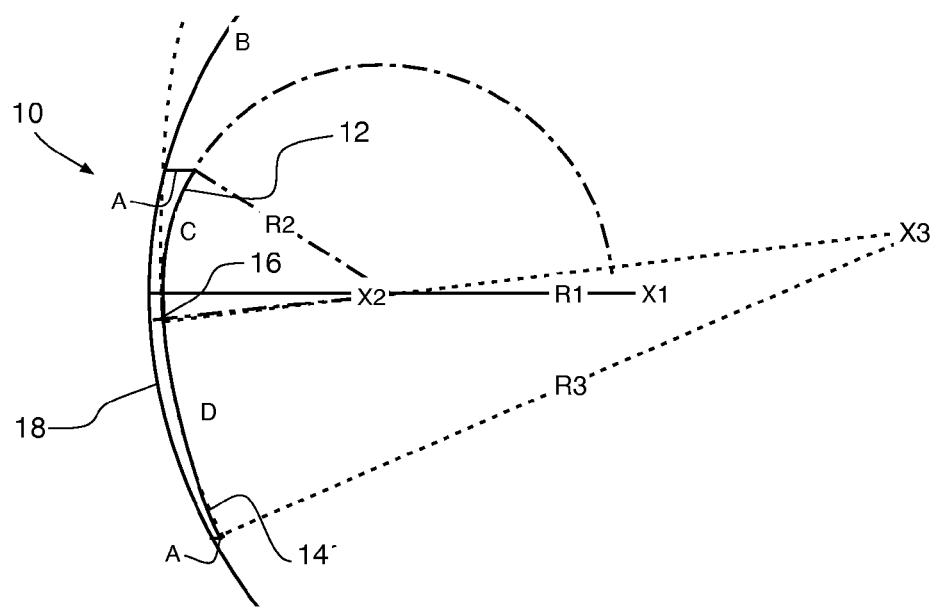
FIG. 3 shows in section a second lens of the same type shown in FIG. 1.

Referring to FIG. 3, a line marked with letter B (R1, X1) indicates the convex surface 18 of the lens 10, while the line C (R2, X2) indicates the distance visual field 12 (with shorter diameter of the arch) at the concave inner surface, and the line D (R3, X3) (with longer diameter of the arch) indicates the near visual field 14. Lines A mark the top and bottom edges of the lens.

A lens such as the inventive lens 10 eliminates progressive corridor existing in a conventional progressive lens, which results from arched surface of the distance visual field failing to contact the arched surface of the near visual field. Embodiments of the invention also eliminate bifocal lines or image jumps, which result from arched surfaces either contacting in a non-tangent fashion, or overlapping to form the conventional bifocal line. Accordingly, embodiments of the invention provide direct transition from acute distance visual field of the first optical surface 12 to acute near visual field of the second optical surface 14.

Figure 4:
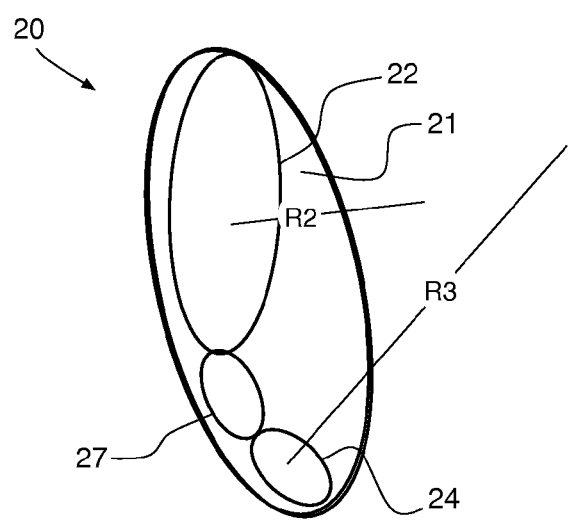
FIG. 4 shows in perspective a third lens according to another embodiment of the invention with first and second optical surfaces connected via a contact surface.

FIG. 4 shows details of an exemplary lens 20 embodying a second variation of the invention, individually and generically optimized. The lens 20 has a concave (eye) surface 21, which includes a first optical surface 22 defining a distance visual field, and a second optical surface 24 defining a near visual field. The lens 20 is individually optimized utilizing Ray Tracing Analysis which, in addition to correcting vision defects, take into consideration: pupillary distance, distance from the lens to the cornea, lens tilt angle—vertical and horizontal, final thickness of ophthalmic lenses, parameters of semi-finished lens: front curvature, refractive index, chromatic aberration index, size and shape of frames, and a specific purpose glasses. The lens also is generically optimized based on statistical data related to parameters such as: human face anatomy, frames design, and parameters of the semi-finished lens.

In the lens 20, according to its embodiment of the invention, the first and second optical surfaces 22, 24 are connected via a contact surface 27. In particular embodiments, radii of the first and second optical surfaces 22, 24 may lie on a centerline of the contact surface 27.

The exemplary lens 20 allows for pragmatic variations in positioning of first and second optical surfaces 22, 24, which may not be precisely tangent at a desired contact point (not shown). For lenses where tangent contact of the two optical surfaces was not feasible, the contact surface 27, which is maintained smaller than a diameter of the prescribed wearer's pupil, advantageously provides substantially the same benefits as would be provided by a contact point. In certain embodiments the contact surface 27 is smaller than a diameter of the prescribed wearer's dilated pupil; in other embodiments smaller than a diameter of the prescribed wearer's undilated pupil; in yet other embodiments smaller than a diameter of the prescribed wearer's constricted pupil.

As mentioned, the inventive design and manufacturing of the lens 10 or 20, according to either of these exemplary embodiments of the invention, advantageously eliminate perceptible optical aberrations at the contact point or contact surface across which the wearer's eyes move between the distance zone and the near zone. The lens does not present interruptions or distortions in any areas designated for vision. Unlike currently offered bifocal lenses, this invention allows for elimination of the dividing line. Unlike currently offered progressive lenses, this invention also allows for elimination of the progressive corridor.

Another aspect of the invention is a process for manufacturing a lens to provide the benefits discussed above. As a first step, lens manufacturing system (LMS) layout data is obtained. The data includes a patient refraction information entry, a semifinished lens selection entry, a frame information entry, a fitting entry, and a special or vocational information entry. A specifically formatted array of this LMS information is sent to a lens design system (LDS). The LDS designs a surface definition file (SDF) for a non-progressive additions lens, and sends the SDF to the LMS along with information regarding specific production line equipment setting parameters. The lens is blanked, taped, blocked, and placed in an HD free-form generator to reproduce the SDF on the lens. After cutting, the lens goes to a free-form polisher for finishing, and thence to a 3-D laser for reference point and lens type information markings. After removing the lens block, the lens is cleaned and dried, inspected for visible surface imperfections, for trueness in respect to the intended lens design performance parameters, for Rx parameters, fitting requirements, frame type requirements and any other vocational parameters.

Although exemplary embodiments of the invention have been described with reference to attached drawings, those skilled in the art will apprehend various changes in form and detail consistent with the scope of the invention as defined by the appended claims.

What is claimed is:

1. A bifocal, non-progressive ophthalmic lens, comprising:
a rotationally symmetric convex surface;
a concave surface opposite the convex surface, said concave surface including:
a first visual field having a first optical power for distance vision, and
a second visual field having a second optical power for near vision,
the first and second visual fields contacting each other in a substantially tangent manner, without a segment and without a progressive corridor, and smoothly blending with the remainder of the concave surface without image jump among the first and second visual fields and the concave surface, wherein respective radii of the first and second visual fields lie on a centerline of a contact surface also included in the concave surface of the lens between the first and second visual fields.

2. The ophthalmic lens as claimed in claim 1, wherein respective radii of the first and second visual fields form a straight line whereby the first and second visual fields are substantially tangent at a contact point.

3. The ophthalmic lens as claimed in claim 1, wherein the contact surface is no larger than a diameter of the prescribed wearer's undilated pupil.

4. The ophthalmic lens as claimed in claim 1, wherein the contact surface is no larger than a diameter of the prescribed wearer's contracted pupil.

5. The ophthalmic lens as claimed in claim 1, wherein the first and second optical surfaces are symmetric about a plane intersecting the concave surface of the lens.

6. A bifocal, non-progressive ophthalmic lens, comprising:
a rotationally symmetric convex surface;
a concave surface opposite the convex surface, said concave surface including:
a first visual field having a first optical power for distance vision, and
a second visual field having a second optical power for near vision, respective radii of the first and second visual fields lie on a centerline of a contact surface also included in the concave surface of the lens, the first and second visual fields contacting each other via the contact surface in a substantially tangent manner, without a segment and without a progressive corridor, and smoothly blending with the remainder of the concave surface.

* * * * *